Oct. 28, 1941.  T. S. ELLIOTT, SR  2,260,563
ICE CREAM DISPENSING CABINET
Filed Feb. 12, 1940    4 Sheets-Sheet 1
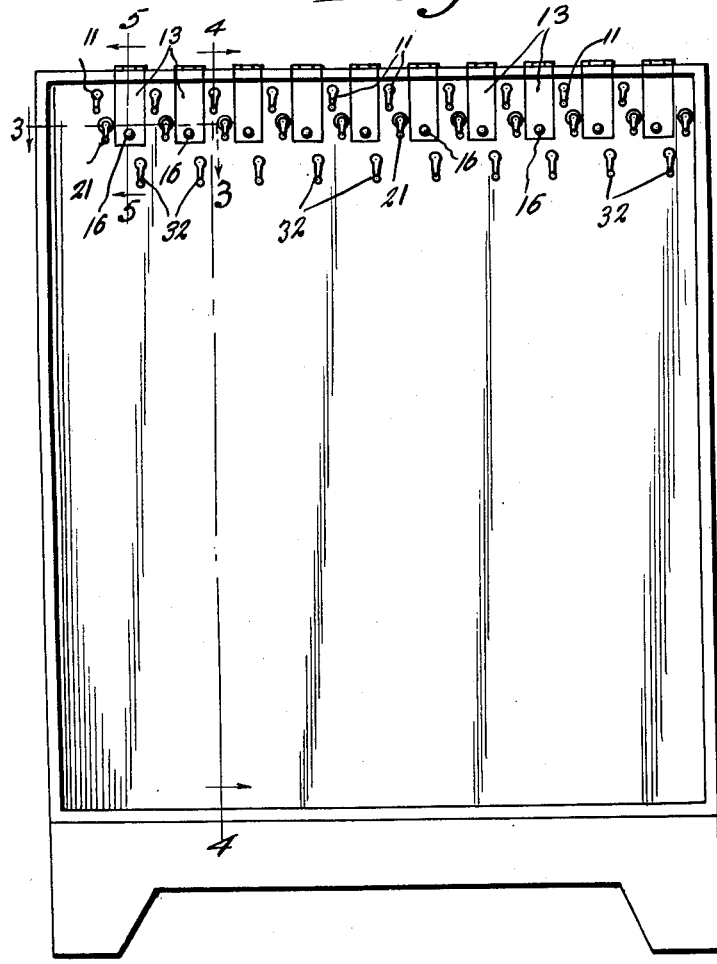
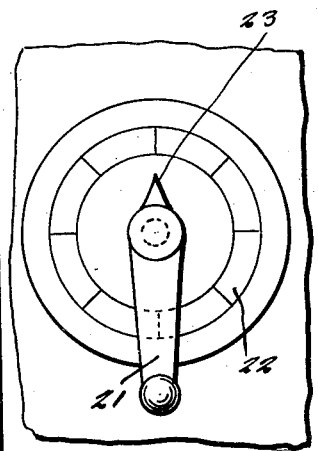
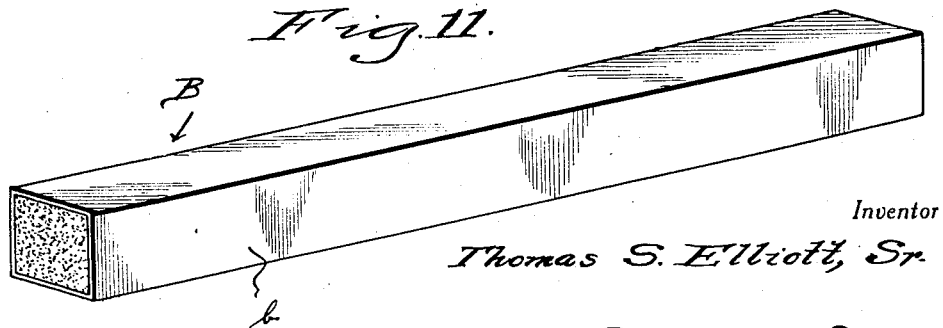
Inventor
Thomas S. Elliott, Sr.
By Clarence A. O'Brien
and Hyman Berman
Attorneys Oct. 28, 1941.  T. S. ELLIOTT, SR  2,260,563
ICE CREAM DISPENSING CABINET
Filed Feb. 12, 1940  4 Sheets-Sheet 2

Inventor
Thomas S. Elliott, Sr.

By Clarence A. O'Brien
and Hyman Berman
Attorneys

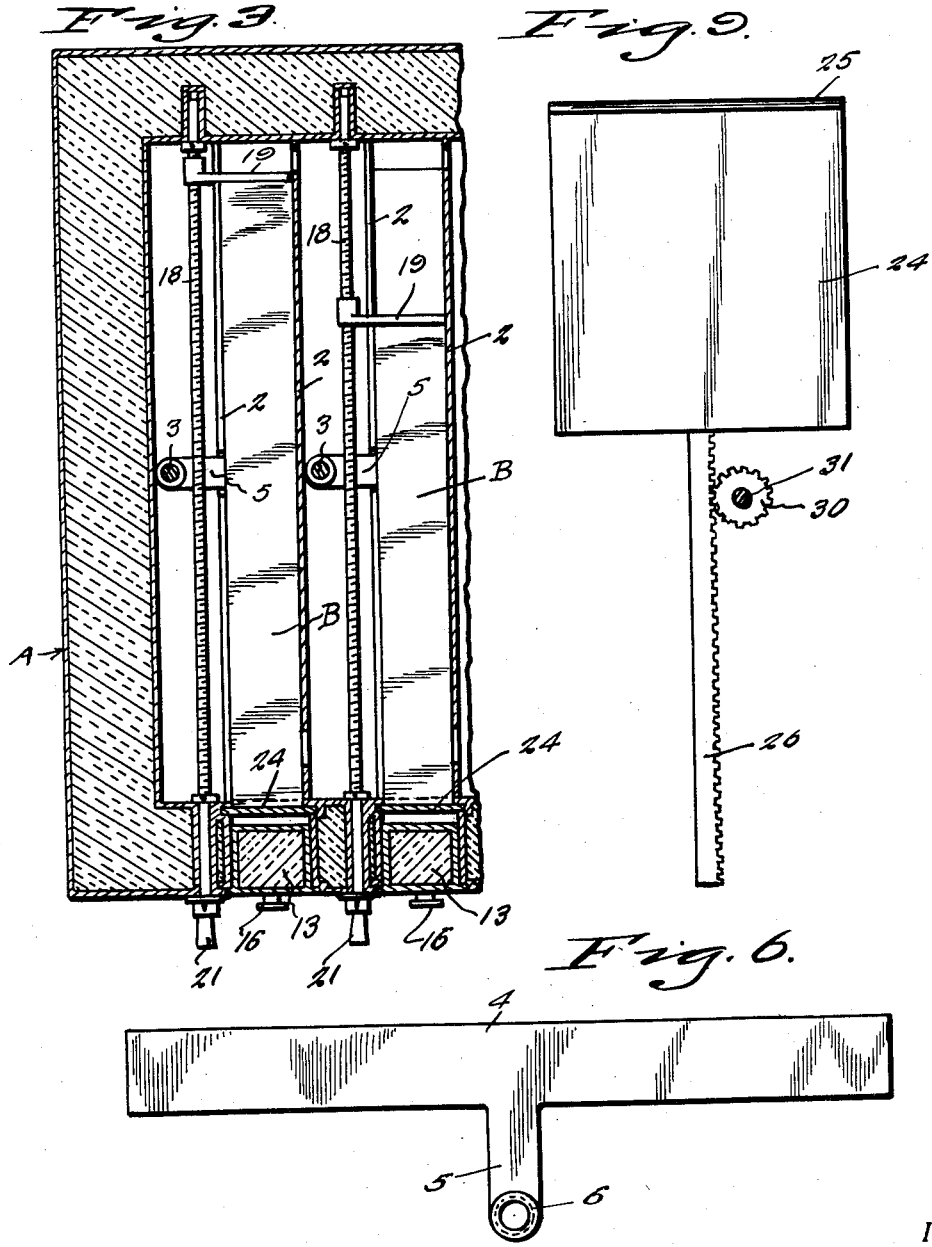

Oct. 28, 1941. T. S. ELLIOTT, SR 2,260,563
ICE CREAM DISPENSING CABINET
Filed Feb. 12, 1940 4 Sheets-Sheet 4
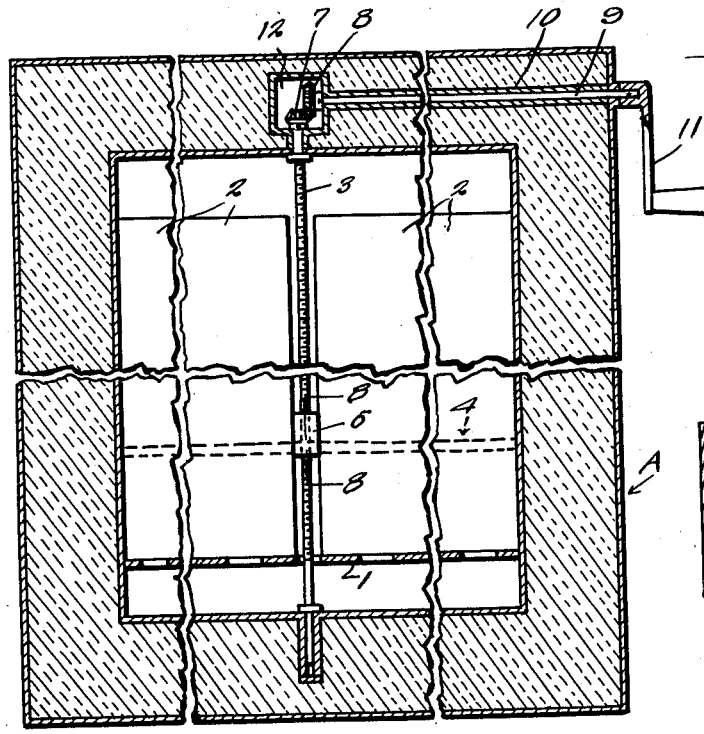
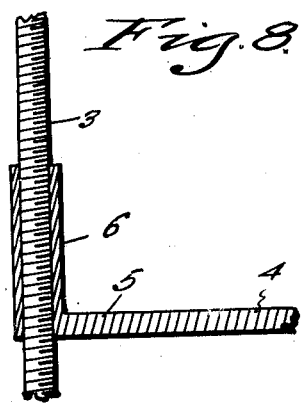
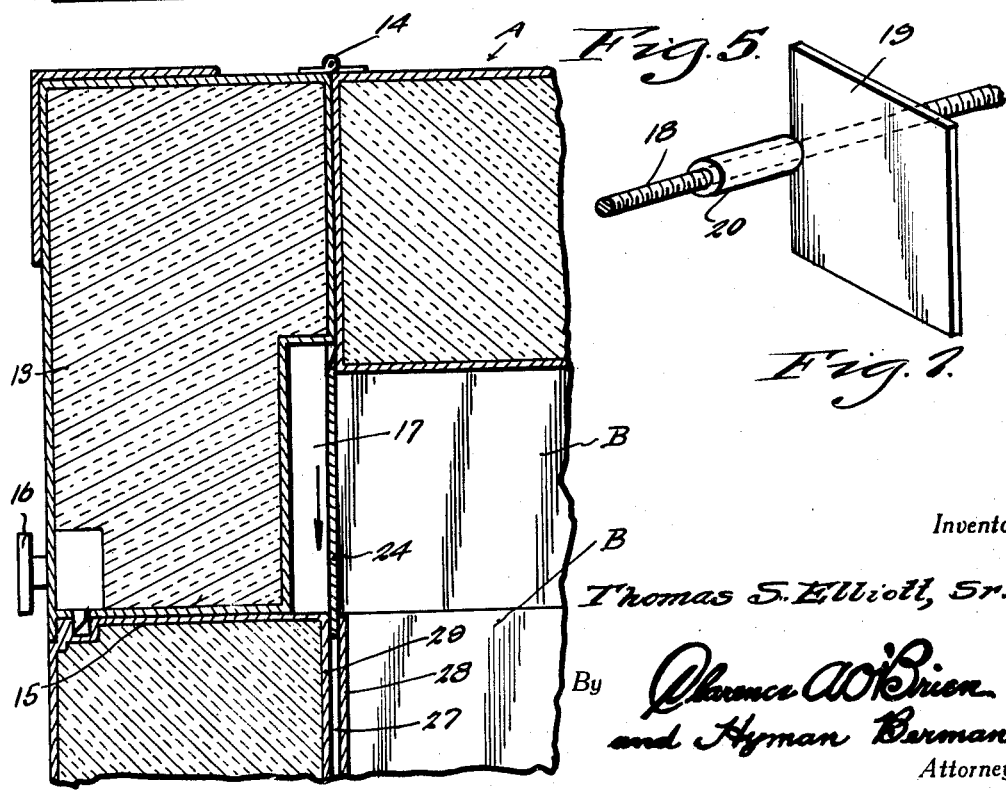
Inventor
Thomas S. Elliott, Sr.
By Clarence A. O'Brien
and Hyman Berman
Attorneys Patented Oct. 28, 1941

2,260,563

UNITED STATES PATENT OFFICE 2,260,563

ICE CREAM DISPENSING CABINET

Thomas S. Elliott, Sr., Pripet, Maine, assignor to Harold Sigler, Norfolk, Va.

Application February 12, 1940, Serial No. 318,600

2 Claims. (Cl. 107—21)

This invention relates to new and useful improvements in ice cream dispensing cabinet, the general object of the invention being to provide a refrigerator cabinet containing means for dispensing the ice cream in such a manner that the cream is not touched by the hands nor a dipper or anything which tends to compress the cream and the cream remaining in the cabinet is kept covered.

Another object of the invention is to so construct and arrange the parts that the maximum amount of material can be placed in the cabinet and the top of the cabinet can be used as a table, counter or the like and the cream is kept in a sanitary condition as all the dispensing means remain in the cabinet and only a small door is opened when the cream is being dispensed.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a front view of the improved cabinet.

Figure 3 is a section on the line 3—3 of Figure 1.

Figure 4 is a section on the line 4—4 of Figure 1.

Figure 5 is a section on the line 5—5 of Figure 1.

Figure 6 is a view of one of the elevator members.

Figure 7 is a view of a follower member.

Figure 8 is a section on the line 8—8 of Figure 4.

Figure 9 is a view of the cutting means.

Figure 10 is a fragmentary front view showing the operating handle for the follower and the dial for indicating the amount of material to be discharged or dispensed.

Figure 11 is a view of a bar of ice cream in its container.

Figure 2:
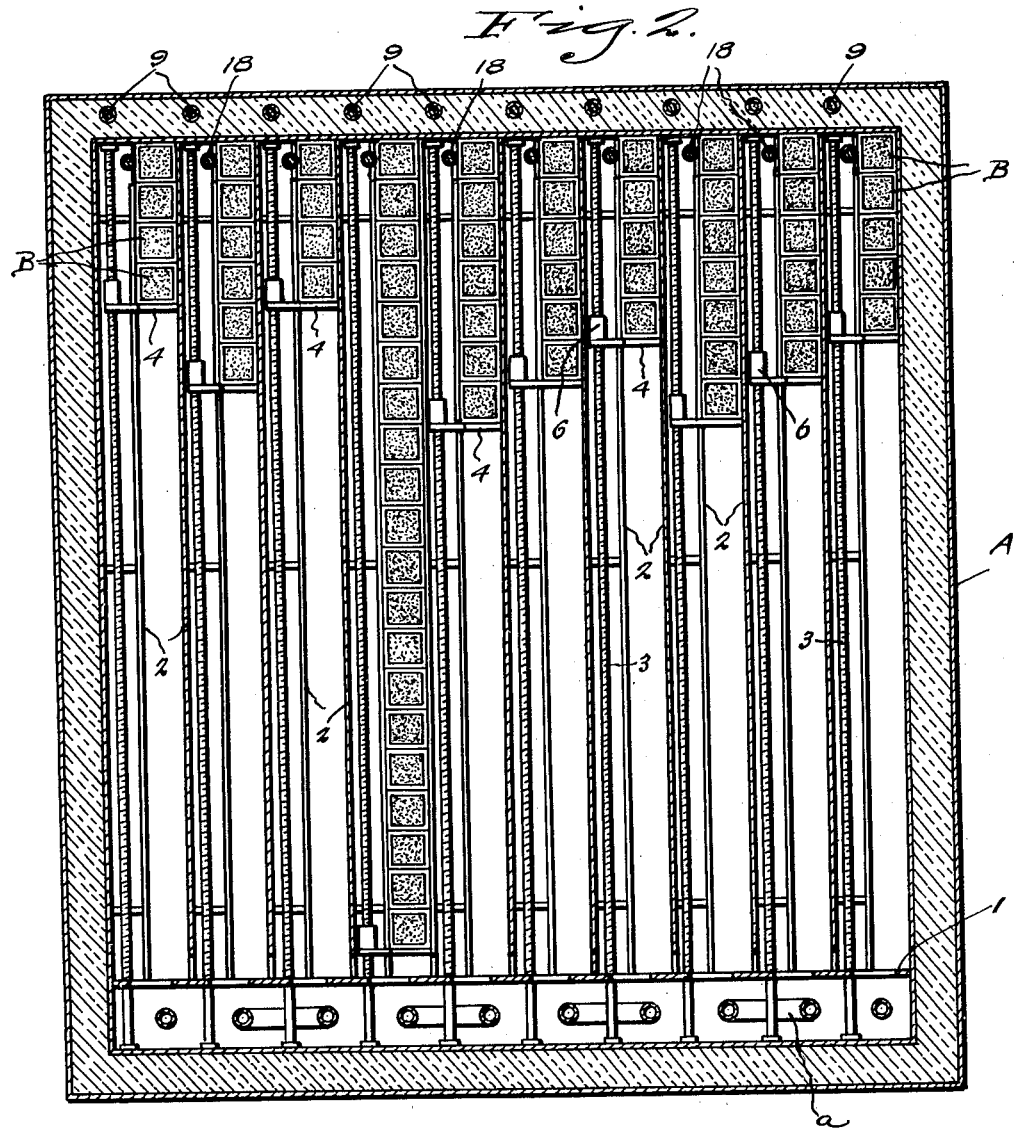
Figure 2 is a vertical sectional view through the cabinet.

In these drawings the insulating cabinet is shown at A and it is provided with any suitable type of refrigerating means, the coil being shown at $a$, a perforated bottom plate 1 being located above the space occupied by the coil. The ice cream or other material to be dispensed by the cabinet is formed in elongated bars of rectangular shape in cross section as shown at B in Figure 11 and each bar is enclosed in wax paper or any other suitable covering means as shown at $b$.

Spaced pairs of vertical partitions 2 are located in the cabinet, the spaces between the pairs being occupied by vertically arranged screw shafts 3 and the space formed by each pair of partitions being adapted to receive a stack of the bars B, said bars being horizontally arranged and the lowermost one rests on an elongated elevator plate 4, see Figure 6, which has a tongue or projection 5 at the approximate center of one edge thereof which passes through a slot in one of the partitions 2 into the space occupied by a screw shaft 3, the outer end of said projection being formed with a tubular part 6 which is internally threaded and the screw shaft passes therethrough as shown more particularly in Figure 8. Thus by rotating the screw shaft in a certain direction the elevator plate 4 is moved upwardly through the compartment containing the stack of bars so that the bars are raised. Of course, by turning the shaft in an opposite direction the elevator plate is lowered to carry any bars thereon to a point adjacent the bottom of the cabinet.

Of course, the screw shafts 3 are suitably journaled at their upper and lower ends in the cabinet parts and the upper end of each screw shaft has a beveled gear 7 thereon which is engaged by a similar gear 8 on a shaft 9 which passes through a tubular part 10 horizontally arranged in the top of the cabinet and extending to the front thereof, the shaft 9 extending from the cabinet where it receives a handle 11. The gears 7 and 8 may be located in a small housing 12 arranged in the insulating material of the cabinet as shown in Figure 4. Thus by turning a handle 11 a screw shaft can be turned to raise the elevator plate with the bars thereon.

A plurality of small openings is formed in the upper front corner of the cabinet each opening being adapted to be closed by a small door 13 (see Figure 5), this door being insulated as shown and it is hinged at its top to the top of the cabinet as shown at 14, the bottom wall of the opening closed by each door forming a shelf 15 which is located a distance from the underface of the top of the cabinet substantially equal to the thickness of a bar B. Each door is provided with a suitable latch and knob 16 and an internal recess 17 which forms a space at the lower inner side of the door.

Horizontally arranged screw shafts 18 are rotatably supported adjacent the top of the compartment of the cabinet, one of these screw shafts 18 being located in each space occupied by a screw shaft 3. Each screw shaft 18 is adapted to move a follower plate 19 having a tubular part 20 attached thereto which is internally threaded to engage the shaft 18, one of these plates being shown in Figure 7. These parts are so arranged that when a bar of ice cream has been lifted to the top of the compartment by an elevator its rear end will be located in front of a follower plate so that by turning this shaft 18 by means of a crank handle 21 at the front of the cabinet the bar will be pressed forwardly through the opening left by the opening of a door 13. A suitable graduated dial 22 is associated with each crank handle 21 at the front of the cabinet for indicating the amount of turning movement of the shaft by the crank handle in order to project the desired amount of bar through the opening. A marker 23 is connected to each crank handle 21 as shown in Figure 10.

A knife 24, see Figure 9, is provided for severing the projected part of each bar, this knife having a beveled upper edge 25 and having a rack bar 26 connected to its lower edge, the knife and its bar being slidably supported for vertical movement in a slot 27 formed in the inner portion of the front of the cabinet by the spacing of the liner or plate 28 of the cabinet and a plate 29 which covers the inner wall of the insulating material, as shown in Figure 5. A toothed wheel 30 engages each rack bar 26 and is attached to a shaft 31 which passes through the front of the cabinet where it has attached thereto a crank handle 32.

Figure 12:
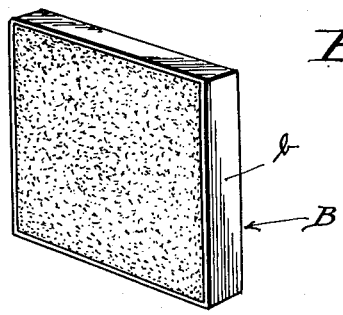
Figure 12 is a view showing a portion cut from the bar of Figure 11.

The bars may be placed in the cabinet through the openings left by the small doors 13 when the same are opened, upon the elevators and the elevators lowered and when the doors are closed the cabinet is practically air-tight so that the ice cream will be kept in good condition with a minimum amount of refrigeration and there is no way in which the ice cream can be contaminated. Then when the customer wishes an order of ice cream it is simply necessary to turn the crank handle 11 to operate one of the screw shafts 3 to bring a bar of ice cream at the top of the cabinet, if such bar is not already at the top of the cabinet. This will place the bar in front of the follower plate 19 and the operator opens the door associated with the bar to be dispensed and lowers the knife 24 which normally closes the opening leading to the interior of the cabinet even after the door is opened. Then the operator turns the crank 21 to the desired position to cause the screw shaft 18 and the follower plate 19 to project the desired amount of ice cream bar into the opening left by the door. Then the handle 32 is turned to lift the knife which cuts a portion from the bar, as shown in Figure 12, this portion resting on the shelf formed by the part 15 so that it can be readily picked up and wrapped or placed in a container and given to the customer. Then the door is closed. By not using a dipper or the like the cream is not compressed so that the dealer does not lose in weight as he does when dippers and the like are used to dispense the cream. Also, the cream is kept in a firm condition by the minimum amount of refrigeration and in a sanitary condition as it is not handled only when being placed in the device or the cut portions removed from the shelf 15 and this can be done without touching the ice cream itself due to the covering means $b$ on the cream. Also while dispensing the cream the cream remaining in the cabinet is not exposed to the air and the top of the cabinet remains closed so that it can be used as a shelf or table. The knife closes the opening through which the cream is projected until it is desired to project some of the cream when the knife is lowered.

As the knife is enclosed in the cabinet under refrigeration at all times the knife will be kept free of the material being cut as said material will not adhere to the knife and the knife will make a clean cut through the material.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described an insulated cabinet for dispensing bars of material, a plurality of vertically arranged partitions in the cabinet, a plurality of vertically arranged screw shafts in the cabinet, an elevator plate between each pair of partitions having a tubular internally threaded part through which a screw shaft passes, means for rotating the screw shafts from the front of the cabinet to raise and lower the elevator plates, horizontally arranged screw shafts at the top of the cabinet, a follower plate having a tubular portion internally threaded through which each horizontal screw shaft passes, means at the front of the cabinet for turning the horizontal screw shafts to cause the follower plates to move a bar of material toward the front of the cabinet after the same has been lifted by the elevator plate, the front of the cabinet having openings therein at the top thereof, one for each bar projected by a follower plate, a door for closing each opening, a vertically movable knife for each opening, said knife being arranged at the inner part of the door and closing the opening through which a bar is projected when the knife is in raised position, and means at the front of the cabinet for raising and lowering each knife.

2. In a device for dispensing bars of material, an insulated refrigerator casing having a top and one side wall having an opening therein which extends through the top and to a point spaced below the plane of the inner face of the top, the lower wall of the opening being flat to form a shelf, an insulated door filling the opening when closed, means actuated from the exterior of the cabinet for projecting a bar through that part of the opening between the shelf and the inner face of the top, a knife vertically movable along an inner part of said side wall and closing communication between the cabinet and the door opening when in raised position and cutting the projecting part of the bar when moving to closed position, means for actuating the knife from an exterior part of the casing, said knife being covered by the door when the door is in closed position.

THOMAS S. ELLIOTT, Sr.